(12) United States Patent
Migliara

(10) Patent No.: US 9,867,451 B2
(45) Date of Patent: Jan. 16, 2018

(54) VEHICLE MOUNTED SUSPENSION APPARATUS

(71) Applicant: Christian Ricardo Migliara, Mastic, NY (US)

(72) Inventor: Christian Ricardo Migliara, Mastic, NY (US)

(*) Notice: Subject to any disclaimer, the term of this patent is extended or adjusted under 35 U.S.C. 154(b) by 137 days.

(21) Appl. No.: 15/056,485

(22) Filed: Feb. 29, 2016

(65) Prior Publication Data

US 2017/0245625 A1 Aug. 31, 2017

(51) Int. Cl.
*A47C 17/80* (2006.01)
*A45F 3/24* (2006.01)

(52) U.S. Cl.
CPC ............. *A45F 3/24* (2013.01); *A47C 17/80* (2013.01)

(58) Field of Classification Search
CPC ........................................ A47C 17/80
USPC ........................................ 5/118–122
See application file for complete search history.

(56) References Cited

U.S. PATENT DOCUMENTS

| 5,170,521 A * | 12/1992 | Light | A45F 3/22 |
| | | | 5/118 |
| 9,179,759 B1 * | 11/2015 | Turner | A45F 3/22 |
| 2013/0298327 A1 | 11/2013 | Snoddy | |

* cited by examiner

*Primary Examiner* — Fredrick Conley
(74) *Attorney, Agent, or Firm* — Dunlap Bennett & Ludwig PLLC; Brendan E. Squire

(57) ABSTRACT

A suspension apparatus includes a woven net portion that attaches to a motor vehicle. The woven portion is suspended between opposed structural members on the vehicle by bars extending transversely across the opposed ends of the woven portion. Bars are received in a plurality of hooks that are secured to the structural members via an adjustable strap.

10 Claims, 4 Drawing Sheets

VEHICLE MOUNTED SUSPENSION APPARATUS

BACKGROUND OF THE INVENTION

The present invention relates to accessories for motor vehicles, and more particularly to accessories for a user of the vehicle suspend items while the motor vehicle is stationary.

Currently in the art, suspension platforms are flimsy, unstable and do not feel safe when an occupant would like to mount the suspension platform. Moreover, currently existing platforms are difficult to attach to and remove from a vehicle.

As can be seen, there is a need for an improved vehicle mounted suspension apparatus that may be readily attached and removed from the vehicle and provides for adjustment to a user's preference.

SUMMARY OF THE INVENTION

In one aspect of the present invention, a suspension apparatus is provided which may be formed of an elongate woven portion having a plurality of end loops at a first end and a second end of the elongate woven portion; a bar extends transversely through the plurality of end loops; a plurality of straps are adapted to secure about a structural member of a motor vehicle; and a plurality of hook brackets, each having a first end with a slot adapted to receive a free end of one of the plurality of straps and a second end with a hook adapted to receive the bar. Other embodiments of the suspension apparatus may also include a buckle attached to the plurality of straps. The buckle is operable to adjust a length of the plurality of straps. Preferably, the hook is oriented with an upturned opening. The bar may a hook formed at a first end and a second end of the bar.

Other aspects of the invention includes a method of adapting a suspension apparatus to a vehicle. The method includes providing an elongate woven portion having a plurality of end loops at a first end and a second end of the elongate woven portion; inserting a bar through the plurality of end loops; securing a plurality of straps about a structural member of the vehicle, each of the plurality of straps retaining a hook bracket via a slot defined in a first end of the hook bracket. The method may further include receiving the bar in a hook formed in a second end of the hook bracket. The plurality of straps may also be adjusted via a buckle attached one or more of the plurality of straps. Preferably, the hook is oriented with an upturned opening. The bar may have a hook formed at a first end and a second end of the bar.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a suspension that a user can configure within a motor vehicle. In a preferred embodiment, the suspension apparatus may be configured to be suspended across the forward roll cage bars of an open top sport utility vehicle.

Figure 1:
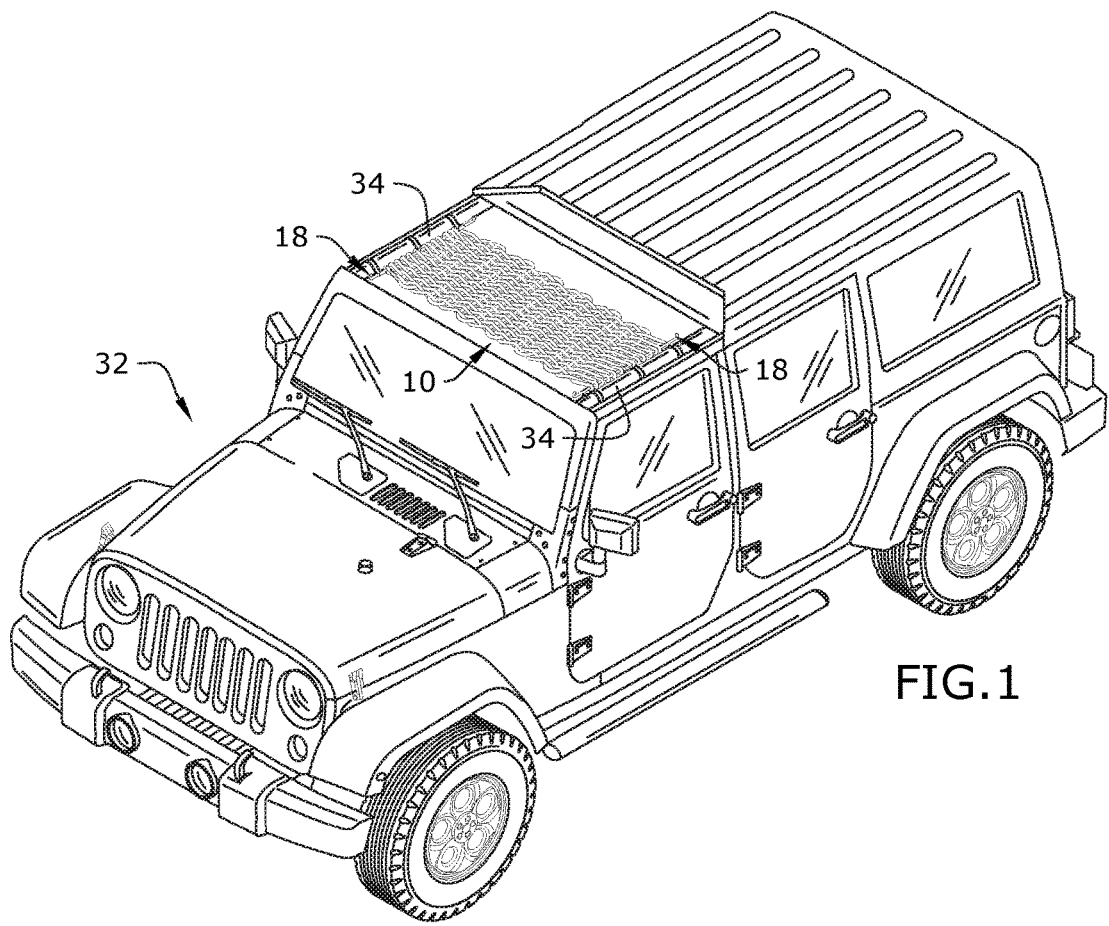
FIG. 1 is a perspective view of the invention shown installed.
Figure 2:
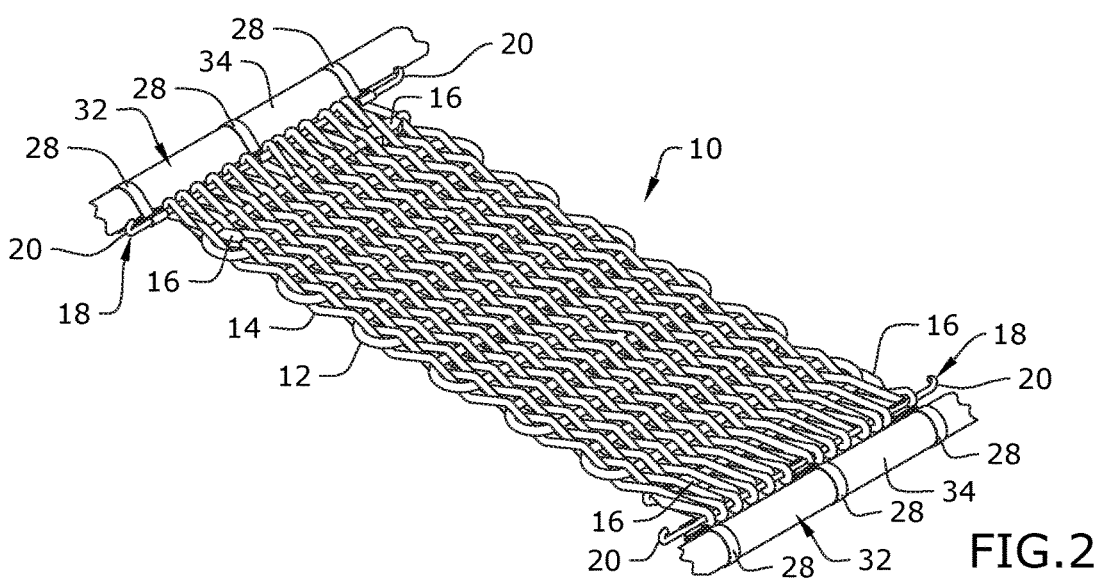
FIG. 2 is a perspective detail view of the invention shown installed.
Figure 3:
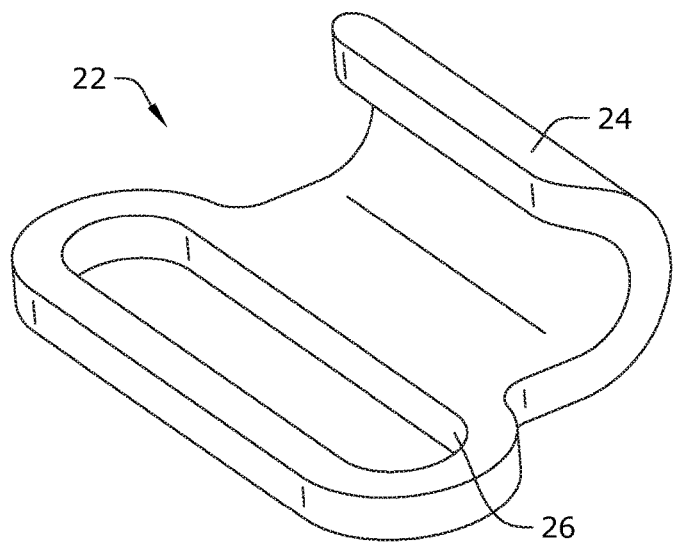
FIG. 3 is a perspective view of the invention item 22 strap hook brackets.
Figure 4:
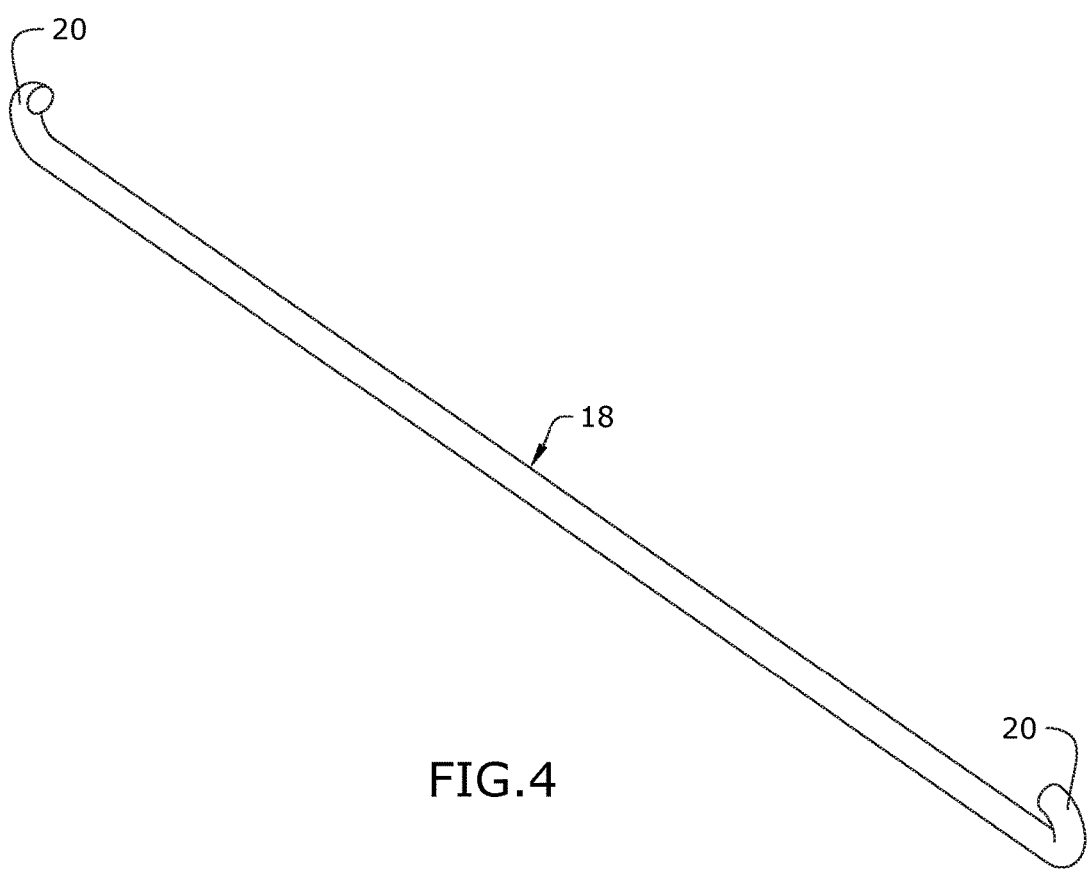
FIG. 4 is a perspective view of the invention item 18 double hooked bar.
Figure 5:
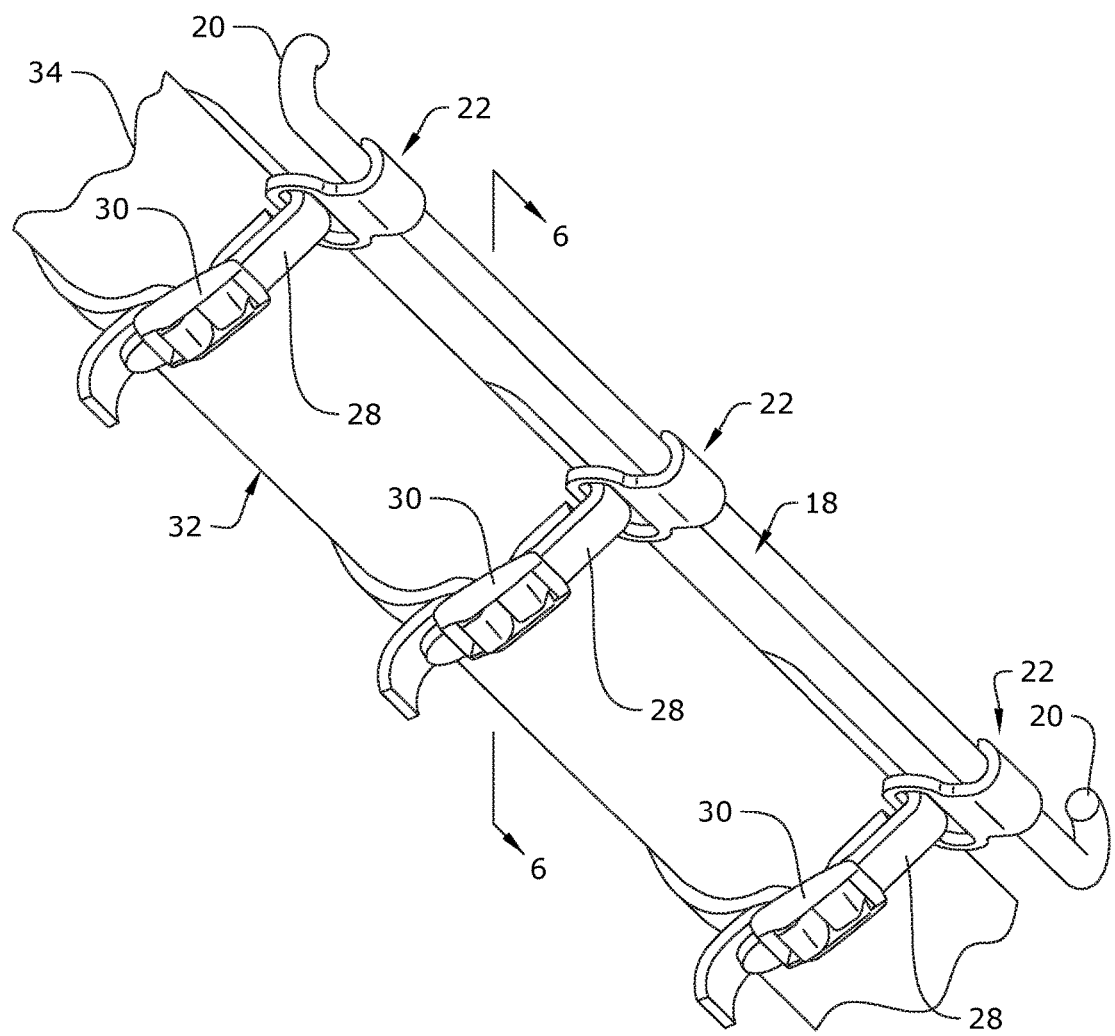
FIG. 5 is a lower perspective detail view of the invention shown installed and omitting rope components for illustrative clarity.
Figure 6:
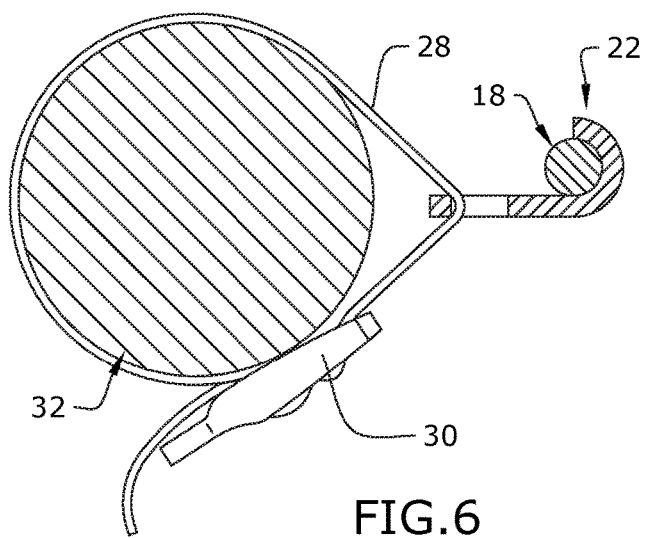
FIG. 6 is a section detail view of the invention along line 6-6 in FIG. 5.

As best seen in reference to FIG. 1, a suspension apparatus 10 of the present invention includes a woven portion that may be suspended between structural members 34 of a motor vehicle 32, such as the forward roll cage bars 34 of an open top sport utility vehicle, such as a Jeep®. The woven portion is preferably formed by a Dutch weave of a first rope 12 and a second rope 14. The longitudinal ends of the woven portion are wrapped around a laterally disposed bar 18. The bar 18 may have a first and a second hooked end 20 so as prevent the bar from sliding out from the ends of the woven portion. The bar 18 may be formed of metal and bent at the ends thereof.

As seen in reference to FIGS. 2-6, a plurality of straps 28 may be looped around the structural member 34 with a free end of the strap 28 secured with a buckle. A hook bracket 22 is adapted to receive the free end of the strap 28 through a slot 26 extending transversely across a first end of the hook bracket 22. A hook 24 is formed at the second end of the hook bracket 22 and is defined with a curvature adapted to cooperatively engage with the bar 18.

To secure the suspension apparatus 10 to the structural members 34, the straps 22 are routed around the structural member 34 and loosely fed through the buckle 30. The hook brackets 22 should be received such that the hook 24 is oriented upwardly. The bar 18 is fitted within the hooks 24 along a first side. The suspension apparatus 10 may then be extended to then secure the bar 18 on the opposite end of the apparatus 10 within the hooks 24 at an opposed structural member 34. Once the bar 18 at each end of the apparatus 10 is secured in its respective hooks 24, the straps 28 may be adjusted within the buckles 30 in order to shorten or lengthen the width of the bars 18 between the support members 34 thereby adjusting the support provided by the suspension apparatus 10. By having the straps 28 pull on the bars 18 the woven member may be drawn tight across the open space between the roll cage bars 34 and the bar 18 to secures it in place.

When installed in a motor vehicle, the suspension apparatus 10 may be utilized for supporting articles on the motor vehicle. More preferably, the suspension apparatus 10 provides a location for the operator of the motor vehicle to rest on, particularly on breaks, during an off-roading excursion.

Its positioning on the top of the motor vehicle 32 allows the operator to enjoy a better vantage point for viewing the outdoors, or other sights where an elevated vantage point will provide better visibility, such as sporting events, concerts, fireworks displays, and the like. In off-road conditions, the operator may also lay upon the suspension apparatus 10 and enjoy some restful sleep while avoiding hazards associated with crawling insects, spiders, snakes, reptiles and smaller animals.

Figure 7:
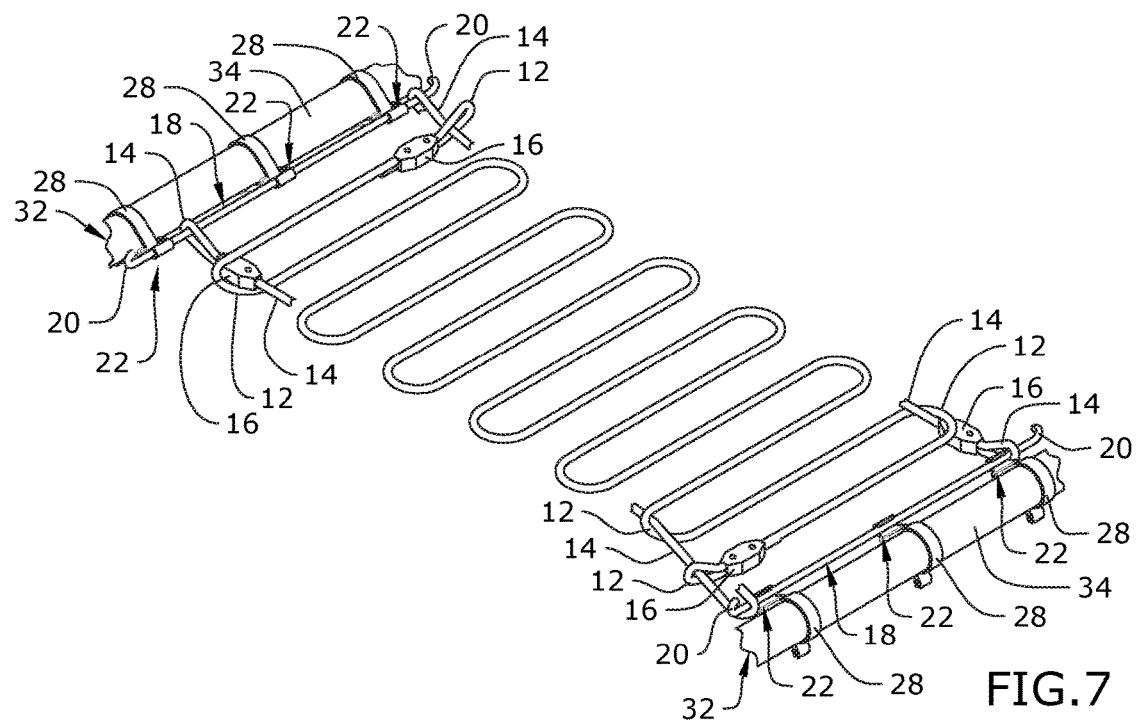
FIG. 7 is a perspective detail view of the invention shown installed and omitting portions of item 14 rope B for illustrative clarity of clamp location.
Figure 8:
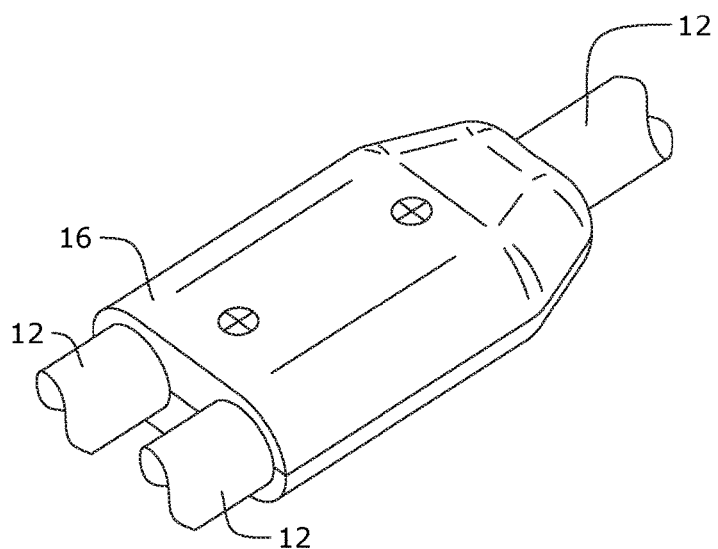
FIG. 8 is a detail perspective view of the invention item 16 rope clamps.

As seen in reference to FIG. 7 and FIG. 8, the woven portion may be formed by a first 12 and a second 14 rope that is woven in a Dutch weave. The free ends of the ropes 12, 14 may be secured within a clamp 16 to prevent the woven portion from unraveling. The weave may be is formed with, for example, a first rope 12, such as a ⅜ inch size rope, that may be laid transversely in roughly 15 loops defining a loom. The ends of the first rope 12 may be secured together with a clamp 16 to secure the free ends of the first rope 12. The second rope 14 may then be interwoven longitudinally between the transverse lengths of the first rope 12 loom. The bar 18 may then be fed through the end loops of the woven second rope 14. When the second rope 14 has been interwoven in the loom formed by the first rope 12, the ends may similarly be secured in a clamp 16.

When the user desires to remove the suspension device 10 from the vehicle 32, the straps 28 may be loosened at the buckles 30. The bar 18 at a first end may then be withdrawn from the hooks 24. The user may then remove the bar 18 from the hooks 24 at the opposite end. The suspension device 10 may then be rolled up and stowed. The straps 28 may be left in position about the support members 34 to facilitate reattachment of the suspension apparatus 10.

While illustrated as being suspended from the structural members 34 as part of the roll cage of a vehicle, the structural members may be provided at any location on the vehicle 32, such as in the bed. Similarly, the suspension apparatus 10 may be oriented laterally across the vehicle or along a longitudinal length of the vehicle.

It should be understood, of course, that the foregoing relates to exemplary embodiments of the invention and that modifications may be made without departing from the spirit and scope of the invention as set forth in the following claims.

What is claimed is:

1. A suspension apparatus, comprising:
    an elongate woven portion having a plurality of end loops at a first end and a second end of the elongate woven portion;
    a bar extending transversely through the plurality of end loops;
    a plurality of straps adapted to secure about a structural member; and
    a plurality of hook brackets each having a first end with a slot adapted to receive a free end of one of the plurality of straps and a second end with a hook adapted to receive the bar.

2. The suspension apparatus of claim 1, further comprising:
    a buckle attached to the plurality of straps.

3. The suspension apparatus of claim 2, wherein the buckle is operable to adjust a length of the plurality of straps.

4. The suspension apparatus of claim 3, wherein the hook is oriented with an upturned opening.

5. The suspension apparatus of claim 4, wherein the bar further comprises a hook formed at a first end and a second end of the bar.

6. A method of adapting a suspension apparatus to a vehicle, comprising:
    providing an elongate woven portion having a plurality of end loops at a first end and a second end of the elongate woven portion;
    inserting a bar through the plurality of end loops;
    securing a plurality of straps about an opposed structural member of the vehicle, each of the plurality of straps retaining a hook bracket via a slot defined in a first end of the hook bracket.

7. The method of claim 6, further comprising:
    receiving the bar in a hook formed in a second end of the hook bracket.

8. The method of claim 7, further comprising:
    adjusting the plurality of straps via a buckle attached one or more of the plurality of straps.

9. The method of claim 7, wherein the hook is oriented with an upturned opening.

10. The method of claim 6, wherein the bar further comprises a hook formed at a first end and a second end of the bar.

* * * * *